US006127910A

United States Patent [19]

Webb et al.

[11] Patent Number: 6,127,910

[45] Date of Patent: Oct. 3, 2000

[54] HERMETICALLY SEALED PROXIMITY SWITCH

[75] Inventors: Bruce Webb, Lanesville, Ind.; Lisa Santos; Mark Peters, both of Louisville, Ky.

[73] Assignee: Topworx, Inc., Louisville, Ky.

[21] Appl. No.: 09/325,086

[22] Filed: Jun. 3, 1999

Related U.S. Application Data

[60] Provisional application No. 60/088,049, Jun. 5, 1998.

[51] Int. Cl.[7] .......................... H01H 9/00; H01H 35/00; H01H 83/00; H02B 1/24

[52] U.S. Cl. .......................... 335/205; 307/116; 362/120

[58] Field of Search .......................... 335/205–208; 307/116; 362/120

[56] References Cited

U.S. PATENT DOCUMENTS

| | | | |
|---|---|---|---|
| 4,316,145 | 2/1982 | Tann | 324/208 |
| 4,349,814 | 9/1982 | Akehurst . | |
| 4,378,504 | 3/1983 | Yamasaki . | |
| 4,456,834 | 6/1984 | Harris . | |
| 4,583,006 | 4/1986 | Okada . | |
| 5,043,543 | 8/1991 | Weeks . | |
| 5,473,519 | 12/1995 | McCallops . | |
| 5,688,042 | 11/1997 | Madadi . | |

FOREIGN PATENT DOCUMENTS

| | | |
|---|---|---|
| 3123-594 | 1/1983 | Germany . |
| 3539-353 | 5/1987 | Germany . |
| 3-17992(A) | 8/1991 | Japan . |

OTHER PUBLICATIONS

Go Switch—Topworx Product Catalog, pp. 52–71. No Date.

Westlock Valve Monitoring and Control Products Catalog, pp. A52–A55 (1998).

Stonel "Hawkeye" Product Brochure, Pub. No. 4050 (Jan. 1997).

Moniteur "Companion VPT" Product Specification Sheets, Form X1–1098. No Date.

*Primary Examiner*—Michael L. Gellner
*Assistant Examiner*—Raymond Barrera
*Attorney, Agent, or Firm*—Stites & Harbison, PLLC; David W. Nagle, Jr.; Vance A. Smith

[57] ABSTRACT

A magnetic proximity switch comprises an elongated, substantially cylindrical body which houses a switching circuit, said switching circuit closing when a magnetic target passes within a certain range of the switch. This switching circuit preferably comprises two leaf portions hermetically sealed in a glass enclosure within the switch body, a biasing magnet being positioned adjacent one leaf portion for generating a flux that is shared with the one leaf portion, extending the magnetic field toward the end of the switch body and effectively increasing the sensing range of the switch. The switch also is equipped with a plurality of visual indicators, preferably light-emitting diodes, which are illuminated when the switch is closed to provide immediate visual indication as to the position of the switch, regardless of the rotational orientation of the switch.

10 Claims, 3 Drawing Sheets

HERMETICALLY SEALED PROXIMITY SWITCH

This application claims priority from U.S. provisional application 60/088,049, filed Jun. 5, 1998.

BACKGROUND OF THE INVENTION

The present invention relates to proximity switches, and, more particularly, to a generally cylindrical, magnetic proximity switch that provides for an extended sensing range and includes visual indicators spaced at intervals about the body of the switch to provide immediate visual indication as to the status of the switch.

Magnetic proximity switches are commonly used for linear position sensing. A typical magnetic proximity switch includes a switching circuit that is housed within an elongated, generally cylindrical body near a distal end of the cylindrical body. This switching circuit is closed when a target object passes within a predetermined range from the distal end of the cylindrical body. To facilitate installation, the cylindrical body of such prior art proximity switches commonly have a threaded shank portion. The switch thus can be threaded in and through a bore with corresponding threads for simple installation.

The physical structure of the switching circuit in prior art switches may vary. For example, Applicant manufactures one such proximity switch wherein a primary magnet is housed within the cylindrical body of the switch. This primary magnet is positioned near the end of the switch and is linked by a connecting rod to a bias magnet. The bias magnet controls the movement of a common contact between open and closed positions. A central magnet positioned between the primary and bias magnets attracts the primary magnet and repels the bias magnet, maintaining the primary magnet in a retracted position. However, when a ferrous or magnetic object passes within the sensing area at the end of the switch, the attraction between the primary magnet and central magnet is overcome, and the primary magnet is attracted to the object and moves toward the end of the switch. Thus, the connecting rod pulls the biasing magnet forward, and the bias magnet moves the common contact from a closed position to an open position.

Again, a variety of other magnet configurations may also be used in the switching circuit, but a common problem with prior art proximity switches is their limited sensing range. Often, prior art switches are capable only of sensing ferrous or magnetic objects that pass within 0.100 inches of the end of the switch body. In many applications, the small gap required for the sensing operation precludes the use of prior art switches. For example, debris may accumulate within the gap near the end of the switch, or vibrations or other movement may necessitate greater clearances.

When proximity switches are used for linear position sensing, they are often equipped with a visual indicator, commonly a light-emitting diode (LED), which is energized when the switch moves from one position to another, i.e., from open to closed. However, because these switches are commonly threaded for installation, depending on the rotational orientation of the switch body, the indicator (LED) may or may not be visible. Moreover, typical LEDs may be dim and difficult to see from a distance.

It is thus an object of the present invention to provide a generally cylindrical, magnetic proximity switch that provides for an extended sensing range compared to prior art switches.

It is a further object of the present invention to provide a proximity switch having visual indicators than can be easily seen irrespective of the switch's rotational orientation.

These and other objects and advantages of the present invention will become readily apparent upon a reading of the description herein along with the appended drawings.

SUMMARY OF THE INVENTION

The present invention is a magnetic proximity switch that closes when a magnetic target passes within a certain predetermined sensing range. The switch has an elongated, substantially cylindrical body which houses a switching circuit. This switching circuit preferably comprises two leaf portions, a moveable portion and a stationary portion, hermetically sealed in a glass enclosure within the switch body. Also housed within the switch body is a biasing magnet that generates a flux that is shared with the moveable leaf portion, thus extending the magnetic field toward the end of the switch body. The switch further includes a plurality of visual indicators, preferably light-emitting diodes, which are illuminated when the switch is closed to provide immediate visual indication as to the position of the switch, regardless of the rotational orientation of the switch.

DESCRIPTION OF THE PREFERRED EMBODIMENTS

Figure 1:
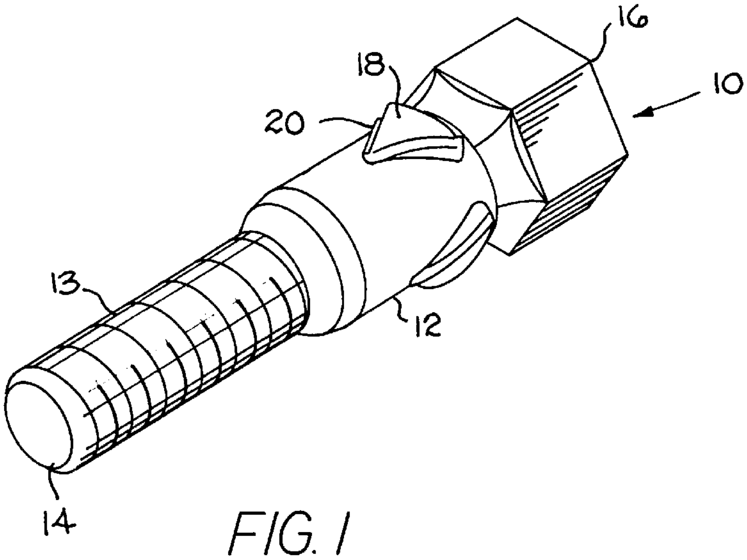
FIG. 1 is a perspective view of a hermetically sealed proximity switch made in accordance with the present invention.

As shown in FIG. 1, a proximity switch 10 made in accordance with the present invention is comprised of a generally cylindrical body 12, closed at the sensing end 14, and open at the control end 16. The switch body 12 has a shank portion 13 adjacent the sensing end 14 that is preferably threaded for easy installation of the switch 10 into a bore with corresponding threads. Such a bore might be located in a frame portion of a machine that is monitored by the proximity switch. Lead wires (shown in FIG. 2 and described below) enter the control end 16 and transmit the state of the switch 10 to a local or remote location. Arrayed around the circumference of the switch body 12 is a plurality of visual indicators 18 that are illuminated when the switch 10 is closed, providing an immediate visual indication as to the position of the switch 10. In this preferred embodiment, there are three such visual indicators 18 spaced at 120-degree intervals around the circumference of the switch body 12. Each of the indicators 18 is comprised of a lens 20 that is seated and sealed in an opening in the switch body and a light-emitting diode, or LED, as will be further described below. To ensure that the light is bright and can be easily seen, each lens 20 is treated with a diffusion pigment for maximum light dispersion. The combination of the light-diffusing lenses 20 and the spacing of the visual indicators 18 around the circumference of the switch body 12 allows an operator to easily see whether or not the switch 10 is closed, regardless of the rotational orientation of the switch 10.

Figure 2:
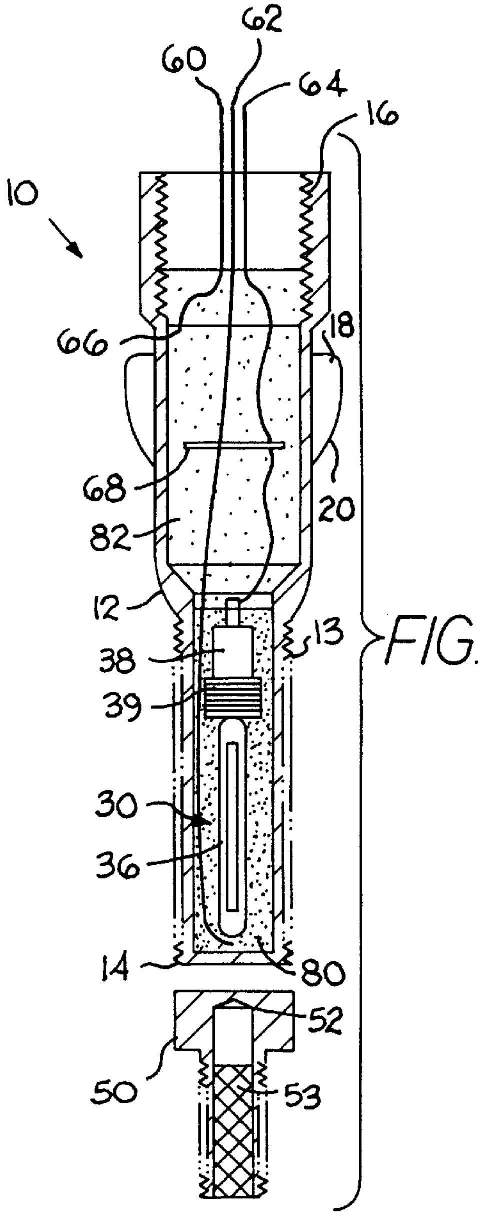
FIG. 2 is a side sectional view of the proximity switch of FIG. 1, along with a side sectional view of the preferred target that said proximity switch senses.

FIG. 2 is a side sectional view of the preferred proximity switch 10. As shown, in this preferred embodiment, three lead wires 60, 62, 64 enter the control end 16 of the switch body 12. One lead wire 60 is a ground wire that terminates at a grounding clip 66 positioned within the internal cavity of the switch body 12 near the open control end 16. The other two lead wires 62, 64 continue into the switch body 12 where they are operably connected to an LED circuit board 68 in the upper portion of the switch body 12, and a switching circuit, generally indicated by the reference numeral 30, in the shank portion 13 of the switch body 12.

Figure 4:
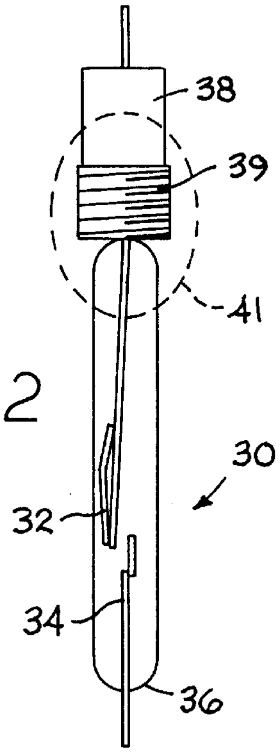
FIG. 4 is an enlarged view of the contact portion and bias magnet of the proximity switch of FIG. 1 with the contact in an open position.
Figure 5:
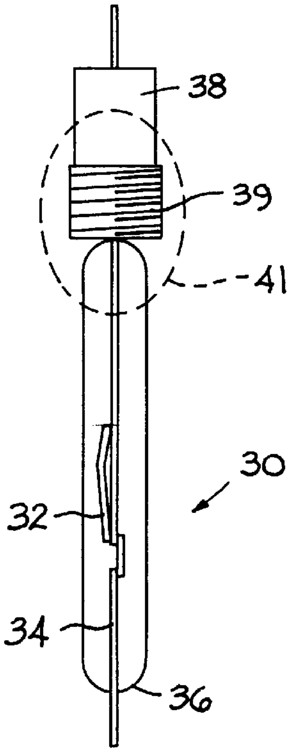
FIG. 5 is an enlarged view of the contact portion and bias magnet of the proximity switch of FIG. 1 with the contact in a closed position.

The switching circuit 30 performs the actual switching function. As best shown in the enlarged views of FIGS. 4 and 5, the switching circuit 30 includes a movable leaf 32 that may be closed against a stationary leaf 34 to close the circuit 30. The stationary leaf 34 and the movable leaf 32 are enclosed within a hermetically sealed container 36, preferably a glass container. This sealed container 36 is contained within the shank portion 13 of the switch 10 near the closed end of the switch 14. A biasing magnet 38 that is axially magnetized is positioned external to the sealed container 36, and serves to extend the sensing range of the switch 10, as will be further described below. Also, in this preferred embodiment, brass spacers 39 are used to prevent the biasing magnet 38 from actually contacting the glass container 36.

To protect the sealed container 36 and the biasing magnet 38, the container 36 and biasing magnet 38 are encapsulated in a potting compound 80, preferably a silicone-based potting that is poured into the shank portion 13 of the switch 10 and solidifies, holding the components in place. Similarly, a potting compound 82 is preferably poured into the upper portion of the switch for protecting the LED circuit board 68. This potting compound 82 is preferably a liquefied epoxy.

As stated above, the biasing magnet 38 serves to extend the sensing range of the switch. Referring to the enlarged views of FIGS. 4 and 5, the biasing magnet 38 is attached to the movable leaf 32, and thus the biasing magnet 38 shares its magnetic flux (shown in phantom and indicated by reference numeral 41) with the movable leaf 32. This causes an attraction between the moveable leaf 32 and the stationary leaf 34, but not an attraction sufficiently strong to cause the moveable leaf 32 to close against the stationary leaf 34.

Referring again to FIG. 2, the target 50 is packed with magnets 52, which may also be encapsulated in a potting compound 53, if necessary. The result is that when the target 50 passes within a certain range of the end of the switch 10, the magnetic flux generated by the magnets 52 is shared with the stationary leaf 34. This creates an even greater attraction between the movable leaf 32 and the stationary leaf 34, an attraction sufficient to close the moveable leaf 32 against the stationary leaf 34. Thus, when the target 50 is more than approximately 0.200 inches away from the sensing end 14 of the switch 10, the switch 10 remains open; however, when the target 50 passes within approximately 0.200 inches of the sensing end 14 of the switch 10, the switch 10 is closed. As stated, prior art constructions generally require that the target be within 0.100 inches of the switch to close the switch 10. Through the incorporation of the biasing magnet 38, the present invention extends this sensing range by at least 100% to about 0.200 inches. Moreover, by increasing the size or strength of the target magnets 52, within practical size and installation limitations, this sensing range may be further extended.

When the switching circuit 30 closes, an electronic signal is generated, a signal which may be transmitted to a control station or other monitoring facility. In this particular embodiment, as mentioned above, it is desired that the closing of the circuit 30 cause the aforementioned plurality of LEDs to be energized and illuminated, and a signal to be sent to a remote location.

Figure 3:
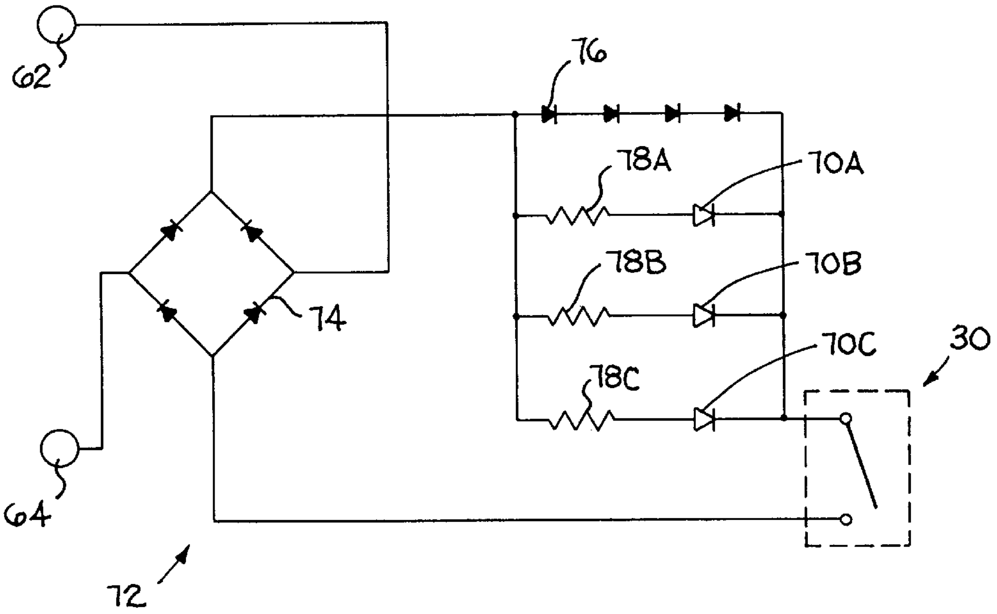
FIG. 3 is a schematic circuit diagram of the switching circuit and LED circuit of the proximity switch of FIG. 1.
Figure 3A:
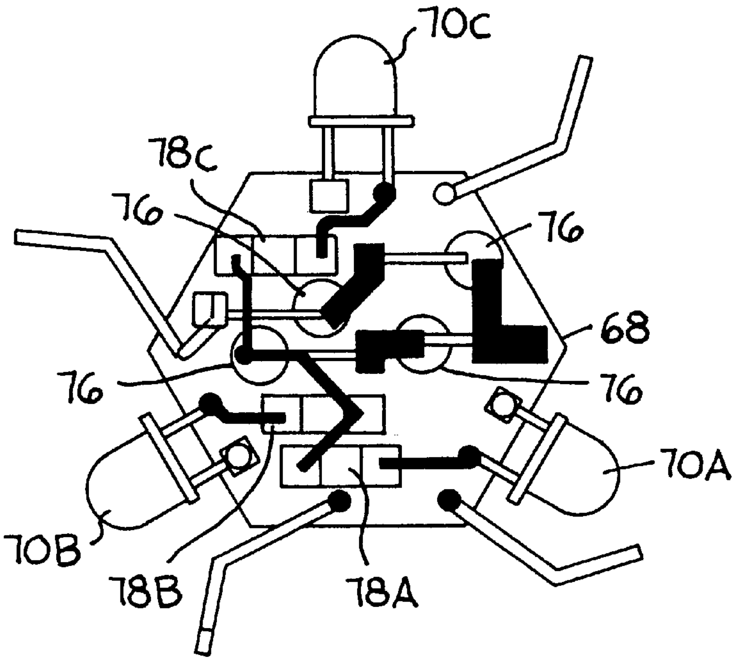
FIG. 3A is an enlarged top view of the preferred LED circuit board of the proximity switch of FIG. 1.
Figure 3B:
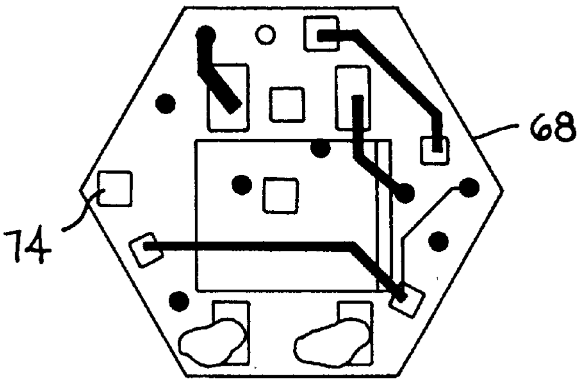
FIG. 3B is an enlarged bottom view of the preferred LED circuit board of the proximity switch of FIG. 1.

FIGS. 3A and 3B show the preferred LED circuit board 68, which is contained within the upper portion of the switch body 12. FIG. 3 is a schematic diagram of the preferred circuit contained on this board, this LED circuit being indicated generally by reference numeral 72. This preferred LED circuit 72 controls the illumination of three LEDs 70A, 70B, 70C. As best shown in FIG. 3, since the LEDs 70A, 70B, 70C are maintained in parallel in the circuit 72, the closing of the switching circuit 30 will simultaneously cause illumination of all three LEDs 70A, 70B, 70C.

Furthermore, the circuit 72 preferably includes a bridge rectifier 74, which is used to convert alternating current into direct current, and one or more of diodes 76, which are used create a voltage drop in the circuit 72. Finally, to create a current flowing through the LEDs 70A, 70B, 70C, a dropping resistor 78A, 78B, 78C is positioned in series with each of the LEDs 70A, 70B, 70C.

As stated above, two lead wires 62, 64 enter the control end 16 of the switch body 12 where they are physically connected to the LED circuit board 68, and thus operably connected to the LED circuit 72. These lead wires 62, 64 provide power to the circuit 72 and also serve to transmit the status of that the switching circuit 30, the voltage drop resulting from the illumination of the LEDs 70A, 70B, 70C providing the necessary indication that the switching circuit 30 has closed.

As described above, the illuminated LEDs are viewable through lenses 20 arrayed about the circumference of the switch body 12. Thus, a visual indication displaying that the switch 10 is closed may be seen regardless of how the switch 10 is rotated.

It is understood that changes may be made in the construction and arrangement of the various components of the present invention without departing from the spirit or scope of the invention as described herein.

What is claimed is:

1. A proximity switch, comprising:

an elongated, substantially cylindrical body defining an internal cavity and having a sensing end, a switching circuit positioned within said internal cavity near said sensing end, said switching circuit closing and generating an electronic signal when a target object passes within a predetermined sensing range measured from the sensing end of said body;

at least three openings spaced at substantially equal intervals around the circumference of said cylindrical body; and at least three visual indicators responsive to said electronic signal, causing the illumination of said visual indicators, said visual indicators being viewable through said openings in said cylindrical body.

2. A proximity switch as recited in claim 1 wherein said cylindrical body has a threaded shank portion adjacent said sensing end, thereby allowing for installation of said switch in a bore having corresponding threads, one or more of said visual indicators being viewable regardless of the rotational orientation of said switch within said bore.

3. A proximity switch as recited in claim 1, wherein said visual indicators are light-emitting diodes.

4. A proximity switch as recited in claim 3, and further comprising at least three lenses seated and sealed in said openings, said lenses being treated with a diffusion pigment for maximum light dispersion.

5. A proximity switch as recited in claim 1, wherein said switching circuit is housed within a hermetically sealed glass container near the sensing end of said switch, said switching circuit including a moveable leaf portion and a stationary leaf portion, said switching circuit closing when a magnetic target passes within a predetermined sensing range measured from the sensing end of said body.

6. A proximity switch as recited in claim 5, and further comprising a biasing magnet that is axially magnetized and positioned external the hermetically sealed glass container, but within said elongated body, said biasing magnet extending said predetermined sensing range.

7. A magnetic proximity switch, comprising:

an elongated body having a control end and a sensing end, and defining an internal cavity;

a hermetically sealed container housed within said elongated body near said sensing end;

a switching circuit housed within said sealed container said switching circuit including a moveable leaf portion and a stationary leaf portion, said switching circuit closing when a magnetic target passes within a predetermined sensing range measured from the sensing end of said body; and a biasing magnet, axially magnetized and positioned external to the sealed container but within said elongated body for extending said predetermined sensing range by providing increased magnetic attraction between said moveable leaf and stationary leaf portions, wherein said switch body is substantially cylindrical and defines at least three openings spaced at substantially equal intervals around the circumference of said cylindrical body, and further comprising at least three visual indicators responsive to an electronic signal generated by the closing of said switching circuit for causing the illumination of said visual indicators, said visual indicators being viewable through the openings defined by said cylindrical body.

8. A proximity switch as recited in claim 7, wherein said cylindrical body has a threaded shank portion adjacent said sensing end, thereby allowing for installation of said switch in a bore having corresponding threads, one or more of said visual indicators being viewable regardless of the rotational orientation of said switch within said bore.

9. A proximity switch as recited in claim 7, wherein said visual indicators are light-emitting diodes.

10. A proximity switch as recited in claim 9, and further comprising at least three lenses seated and sealed in the openings defined by said cylindrical body, said lenses being treated with a diffusion pigment for maximum light dispersion.

* * * * *